United States Patent
Shah et al.

(10) Patent No.: US 7,103,509 B2
(45) Date of Patent: Sep. 5, 2006

(54) SYSTEM AND METHOD FOR PREDICTING COMPONENT FAILURES IN LARGE SYSTEMS

(75) Inventors: Rasiklal Punjalal Shah, Latham, NY (US); Vrinda Rajiv, Schenectady, NY (US); Mark David Osborn, Schenectady, NY (US); Mahesh Kumar Asati, Bangalore (IN); Piero Patrone Bonissone, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 11 days.

(21) Appl. No.: 10/995,981

(22) Filed: Nov. 23, 2004

(65) Prior Publication Data

US 2006/0111857 A1    May 25, 2006

(51) Int. Cl.
*G06F 15/00*    (2006.01)
(52) U.S. Cl. .......................... 702/185; 702/85; 700/52; 706/10; 706/16
(58) Field of Classification Search ...................... None
See application file for complete search history.

(56) References Cited

U.S. PATENT DOCUMENTS 5,646,540 A * 7/1997 Stals et al. .................. 324/691
5,942,689 A   8/1999 Bonissone et al. ............ 73/598
6,073,040 A * 6/2000 Kiyuna ........................ 600/409
2003/0065409 A1 * 4/2003 Raeth et al. .................. 700/31
2004/0216000 A1 * 10/2004 Koehler et al. ................ 714/4
2005/0015009 A1 * 1/2005 Mourad et al. ............. 600/438
2005/0109049 A1 * 5/2005 Chan ........................... 62/129
2005/0148845 A1 * 7/2005 Dean et al. .................. 600/407
2005/0288812 A1 * 12/2005 Cheng et al. ............... 700/109

OTHER PUBLICATIONS

U.S. Appl. No. 10/722,646, filed Nov. 26, 2003, James Joseph Zaput.

* cited by examiner

*Primary Examiner*—Carol S. W. Tsai
(74) *Attorney, Agent, or Firm*—Fletcher Yoder

(57) ABSTRACT

A method for predicting a time to failure of a component in a system is presented. The method comprises obtaining a set of data measurements related to the component. The set of data measurements are representative of a plurality of parameters including a plurality of leading parameters. The method comprises generating a prediction model based upon the leading parameters considered in combination. The prediction model is then used to predict the time to failure of the component based on a set of real-time measurements, wherein the plurality of parameters are processed to predict the time to failure for the component. Finally, a confidence level for the predicted time to failure is determined based upon the plurality of parameters.

27 Claims, 3 Drawing Sheets

SYSTEM AND METHOD FOR PREDICTING COMPONENT FAILURES IN LARGE SYSTEMS

BACKGROUND

The invention relates generally to prediction systems and more particularly to a system and method for predicting component failures in large systems.

A large system may be considered generally to be made up of a plurality of co-operating units or components that interact with one another to enable the effective functioning of the system. Examples of large systems may include, for example, locomotives, aircraft engines, automobiles, turbines, computers, appliances, spectroscopy systems, imaging devices, nuclear accelerators, biological cooling facilities, and power transmission systems. Such large and complex systems are generally monitored by a plurality of sensors to determine one or more performance characteristics of the system. These performance characteristics could comprise, for example, estimates or measurements of physical conditions, operational efficiency, projected remaining operational lifetime, security, or time to failure of the system or a component thereof.

Sensors provide data measurements that represent certain parameters related to the operation of the system, which may be used to measure the degradation of the components of the system over time. Additionally, a prediction system may be a part of such a large system, to further process the data measurements collected by the sensors to determine certain performance characteristics of the system such as, for example, the time to failure of the components in the system.

However, in general, large systems, such as those mentioned above, may be a part of a fleet of systems and each such system in such a fleet may be present at a different physical location or site. In addition, each system belonging to such a fleet of systems may be of different ages, may have non-uniform degradation rates and furthermore, each of the components comprising these systems may themselves have non-uniform degradation rates.

A predictive system that has the capability to identify and predict non-uniform component degradation rates in systems that are a part of a fleet of systems is therefore desired.

BRIEF DESCRIPTION

Embodiments of the present invention address this and other needs. In one embodiment, a method for predicting a time to failure of a component in a system is presented. The method comprises obtaining a set of data measurements related to the component. The set of data measurements are representative of a plurality of parameters including a plurality of leading parameters. The method then comprises generating a prediction model based upon the leading parameters considered in combination. Then, the prediction model is used to predict the time to failure of the component based on a set of real-time measurements, wherein the plurality of parameters are processed to predict the time to failure for the component. Finally, a confidence level for the predicted time to failure is determined based upon the plurality of parameters.

In another embodiment, a system for predicting a time to failure for a component is presented. The system comprises a data acquisition system, configured to obtain a set of data measurements related to the component. The set of data measurements are representative of a plurality of parameters, including a plurality of leading parameters. The system further comprises a training subsystem and a runtime subsystem. The training subsystem is configured to generate a prediction model based upon the leading parameters considered in combination. The runtime system is configured to use the prediction model generated by the training system to predict the time to failure of the component based on a set of real-time measurements, wherein the plurality of parameters are processed to predict the time to failure for the component and a confidence level for the predicted time to failure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
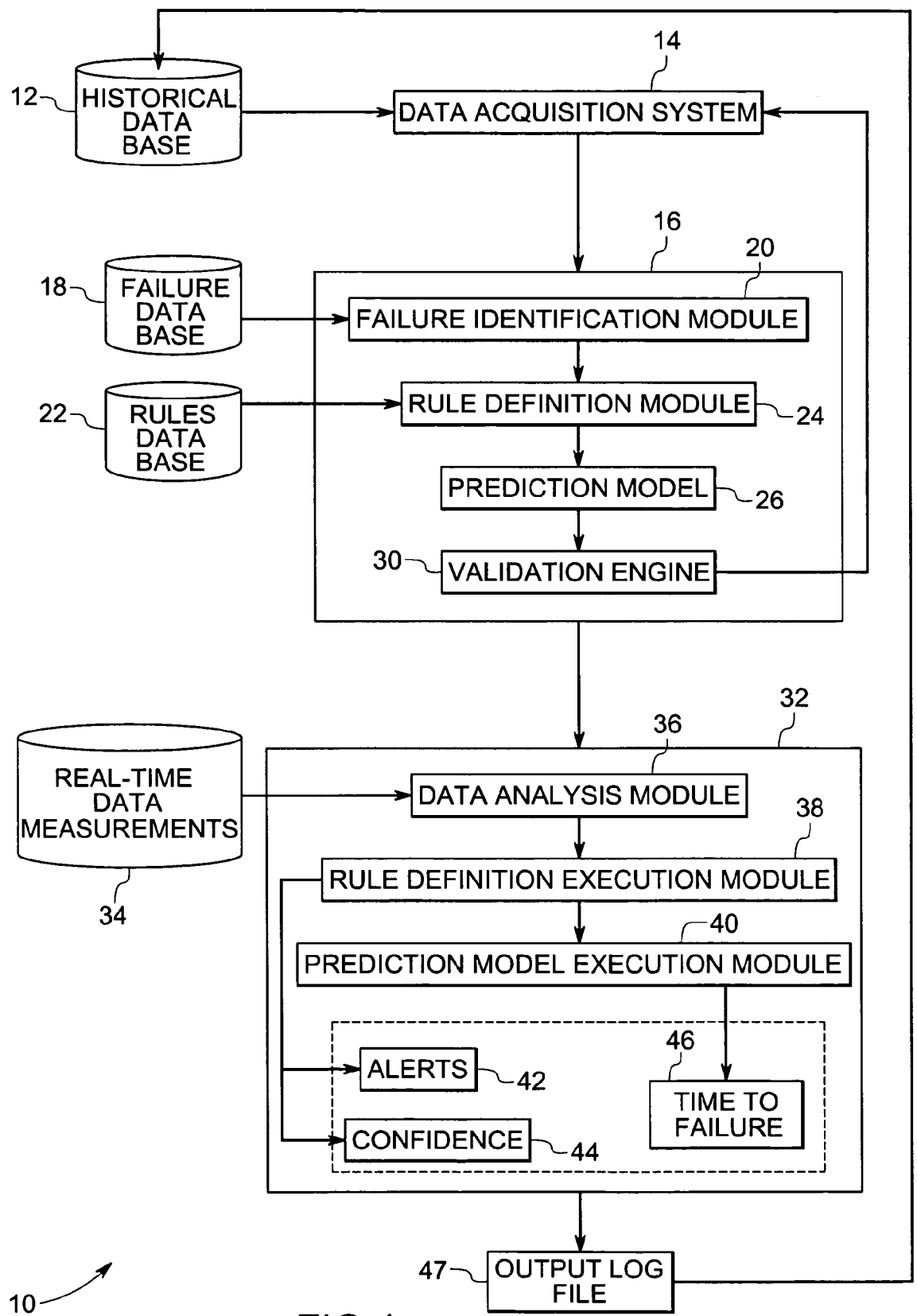
FIG. 1 is a high-level illustration of an exemplary system for predicting the time to failure for a component.

Disclosed herein, is a system and method for predicting the time to failure of components that are a part of large systems. Embodiments of the present invention disclose a prediction system that takes into consideration non-uniform component degradation rates of large systems that are a part of a fleet of systems. In addition, the disclosed prediction system effectively predicts the individual time to failure of selected components belonging to such a fleet of systems, as will be described in greater detail below. Embodiments of the present invention offer many advantages, including facilitating predictive maintenance, reducing maintenance costs, reducing component downtime and preventing component failure and system shutdown.

In one embodiment of the present invention, and as will be described in greater detail below, the large system is an imaging device such as, for example, a Magnet Resonance Imaging (MRI) device or a Nuclear Magnetic Resonance (NMR) imaging device. It is however to be appreciated that the disclosed prediction system for predicting the time to failure of a component is not limited to imaging devices in particular, and may be applied, in general, to a variety of systems or devices, such as, for example, locomotives, aircraft engines, automobiles, turbines, computers, appliances, spectroscopy systems, nuclear accelerators, biological cooling facilities, and power transmission systems, to name but a few.

As will be appreciated by those skilled in the art, imaging devices such as Magnet Resonance Imaging (MRI) devices and Nuclear Magnetic Resonance (NMR) comprise superconducting magnet systems to produce a strong static magnetic field required for these imaging devices. A superconductive electromagnet comprises loops of coiled wire, which is continuously bathed in a cryogen, such as liquid helium, at temperatures sufficiently low to maintain the electromagnet in a superconducting state. Challenges exist, however, in maintaining these electromagnets at these extreme temperatures, which are significantly lower than ambient temperatures. Because of this temperature difference with the ambient temperature, a considerable driving force exists for heat transfer from the environment into the magnet system. Accordingly, thermal insulating material and other heat transfer barriers, such as vacuum regions, may insulate the magnet and cryogen to impede heat transfer from the environment. For environmental heat effects that reach the inner workings of the magnet system, the liquid pool of cryogen that surrounds the magnet must absorb the heat to maintain the magnet at a desired temperature. To conserve cryogen, such as helium, and to support cryogen pressure control, magnet systems in typical MRI devices may include a cryogen condensing system, which recondenses volatilized cryogen back into its liquid phase. Recondensing magnet systems, however, from time to time, require maintenance, for example, when the cryogen condensing system requires repair or replacement. In particular, the performance of the condensing system components may degrade due to wear, thereby reducing the efficacy of the condensing system and overall magnet cooling system (cryogenic cooling system). Moreover, leaks within the cryogen (helium) vessel and/or condensing system, again for example, may also reduce the efficacy of the cooling system.

Embodiments of the present invention, as will be described in greater detail below, employ a rule based system and a prediction system that provide an early identification of an impending failure of a component and further predict a time to failure of a component in the system by monitoring a plurality of parameters related to the component. In particular, with reference to a cryogenic coldhead (i.e., cryogenic refrigeration) system component in a superconducting magnet system as described above, it may be beneficial to monitor a number of parameters related to the component, such as, for example, a heater duty cycle parameter, to facilitate prediction of adverse effects such as abnormal heater duty cycle, indicative of reduced cooling capacity of the coldhead component early enough to prevent helium loss. Furthermore, the prediction of the time to failure of the coldhead component may result in savings on the cost of helium refills and an unnecessary replacement of a coldhead, as well as scheduled or planned replacement of the coldhead or other components.

FIG. 1 is a high level illustration of an exemplary system for predicting the time to failure for a component in a system. In accordance with the present embodiment, the system 10 is configured to predict the time to failure of a component, generate an early alert signal for an impending failure mode associated with the component and further calculate a confidence level in the existence of the failure mode based on the time to failure estimate, as will be described in greater detail below.

In a particular embodiment, and as mentioned above, the component is a cryogenic cooler coldhead component of a superconducting magnet system. Again, it should be noted that the coldhead component in a superconducting magnet system is discussed in the succeeding paragraphs, to describe an exemplary operation of the system 10 for predicting the time to failure of a component in a large system. Those skilled in the art will appreciate that in determining the time to failure of a component, the apparatus of system 10 is applicable to many and various large systems, such as, any of those mentioned above.

As shown in FIG. 1, the system 10 generally includes a data acquisition system 14, a training subsystem 16 and a runtime subsystem 32. The data acquisition system 14 is configured to obtain a set of data measurements related to the component from a historical database 12. In a particular embodiment, the set of data measurements are representative of a plurality of parameters related to the operation of the coldhead component such as, for example, the temperature within the cryogen vessel, the pressure within the helium vessel, the heater duty cycle and the helium level. In accordance with this embodiment, the plurality of parameters include a plurality of leading parameters. In particular, the leading parameters represent a heater duty cycle parameter, a vessel pressure parameter and a shield temperature parameter associated with the superconducting magnet system. In addition, the data measurements may also be representative of a number of additional parameters related to the operation of the coldhead, such as, for example, a water flow parameter, and a water temperature parameter. As will be described in greater detail with respect to FIG. 2 below, the cooling capacity of the superconducting magnet system may be reduced by a failure of the coldhead component (caused generally, by wear of the coldhead). Therefore, monitoring the above parameters may accommodate advanced notification of cryogen system behavior, such as changes in the pressure-temperature equilibrium, as well as changes in performance of some other components, such as, for example, the coldhead, the heater, the thermal insulation, and so forth.

Referring again to FIG. 1, a historical database 12 stores time-series data corresponding to the set of data measurements. In a particular embodiment, each data set in the historical database 12 is identified by a component name, the state of the component (e.g., failed/normal), the date of failure of the component and numerical values for the parameters that describe the current state of the component. In accordance with the present embodiment, the historical database 12 comprises data from both failed sites and normal sites. As used herein, a "site" refers to an installation location of the large system. Furthermore, the data sets in the historical database 12 may be representative of both typical failure modes as well as typical stable conditions related to the component and are derived based on a past behavior pattern of the component as will be described in greater detail below. For example, with respect to the coldhead component in the superconducting magnet system, a typical stable condition may be identified by a normal operation state of the component (represented, for example, by a steady, non-zero vessel pressure) and a typical failure mode may be identified by a coldhead failure (represented, for example, by the abrupt decrease of a heater duty cycle parameter trending to zero).

The training subsystem 16 comprises a failure identification module 20, a rule definition module 24, a prediction model 26 and a validation engine 30. The training subsystem 16 is configured to process the set of data measurements from the data acquisition system 14 and generate a prediction model based upon the leading parameters considered in combination, as will be described in greater detail below.

The data sets that are a part of the data acquisition system 14 are initially processed by a failure identification module 20 and a rule definition module 24. The failure identification module 20 is configured to process the set of data measurements based upon a set of failure modes related to the component. The failure modes are stored in a failure database 18. The failure mode is an indicator of an impending failure related to the component and is derived based on a set of rules defined by the rule definition module 24, as will be described in greater detail below. A failure mode may be indicated, for example, by the rate of change in the data values of the parameters or by the value of a parameter increasing beyond a threshold value. For example, with respect to the superconducting magnet system mentioned above, an increase in the vessel pressure parameter beyond a threshold value (such as 5.25 PSI or greater) may be indicative of a failure mode for the coldhead component. Furthermore, in accordance with a present embodiment, in order to increase the accuracy of the generated prediction model, the data sets that represent multiple failure modes or that represent failure modes that are indicative of failures other than the coldhead component failure are discarded based on the set of rules defined in the rule definition module 24.

The rule definition module 24 is configured to further process the set of data measurements from the data acquisition system based on a set of rules for the plurality of parameters. The rules are derived based on the physics of the operation of the component and specify acceptable rates of change for the parameters. The acceptable rate of change for a parameter may be derived based on past trends exhibited by the parameters or based on expert knowledge of the features of the parameters. The rules are stored in a rule database 22. In addition, the rule definition module 24 may use tolerance values to detect outliers in the data sets. As used herein, the term "outliers" refer to those data sets that have parameter values outside a pre-specified range as defined by the rule definition module 24. In accordance with the present embodiment, the outlier data is discarded by the prediction model and not is used for further analysis. With respect to the superconducting magnet system mentioned above, an outlier may comprise for example, the helium level parameter, or the water temperature parameter or a shield temperature parameter having values outside of a predetermined range or tolerance.

A prediction model 26 is then configured to receive the processed set of data measurements from the failure identification module 20 and the rule definition module 24 and apply a neuro-fuzzy prognostic technique to data measurements to predict the time to failure for the component. In a particular embodiment, the neuro-fuzzy prognostic technique applied is the adaptive neuro fuzzy inference system (ANFIS). As will be appreciated by those skilled in the art, neuro-fuzzy prediction systems such as ANFIS, apply a set of fuzzy sets and fuzzy rules to a set of data samples in conjunction with one or more learning algorithms (generally derived from neural network theory), and generate a training dataset based on the data samples. Then, the generated training dataset is used to determine predictions related to the data samples. This technique of learning from data is generally referred to in the art as neuro-fuzzy adaptive learning. In a present embodiment, the prediction model 26 takes as input, the heater duty cycle parameter, the vessel pressure parameter and the shield temperature parameter, and processes the data sets represented by the above parameters using a set of neuro-fuzzy rules. Then, the prediction model is generated by deriving the relationship between the actual time to failure of the coldhead component, and the interactions between the parameters. Those skilled in the art will realize that the ANFIS technique and the software implementing this technique are generally known, and may be adapted for use in the invention without undue experimentation.

The training subsystem 16 further comprises a validation engine 30 that is configured to evaluate the generated prediction model 26 based upon a portion of data measurements stored in the historical database 12 that are not a part of the training dataset generated by the prediction model 26. This portion of data measurements is referred to as a validation data set and is used by the validation engine 30 to evaluate the quality of the prediction model 26. Accordingly, the portion of data measurements comprising the validation data set that are input into the prediction model 26 do not include time to failure values. In particular, the validation engine 30 interprets the quality of the predictions of the time to failure of the component, by comparing the time to failure estimates of the component as predicted by the prediction model 26, to the actual time of failure of the component as stored in the validation dataset. Further, in accordance with this embodiment, if the comparison performed by the validation engine 30 does not meet the acceptable quality criteria, the historical database may be accessed again for additional data sets, which are subsequently input into the training subsystem 16 for further analysis. When the prediction accuracy reaches an acceptable accuracy, the prediction model 26 is deployed in a runtime subsystem 32 as will be described in greater detail below.

The runtime subsystem 32 is configured to use the generated prediction model 26 to predict the time to failure of the component, based on a set of real-time data measurements. In a particular embodiment, the real-time data measurements represent actual field data from an MRI superconducting magnet system collected at regularly scheduled intervals.

In accordance with the present embodiment, the runtime subsystem 32 further comprises a data analysis module 36, a rule definition execution module 38 and a prediction model execution module 40. The data analysis module 36 is configured to acquire and process the set of real-time data measurements. The data analysis module 36 initially processes the set of real-time data measurements to remove noise and further smoothes and transforms the set of data measurements. In particular, the data analysis module 36 performs certain operations on the data measurements to enable the extraction of certain features from the parameters. For example, in a particular implementation, the additional operations may comprise, determining a percentage change in the helium level parameter over the last two hours, or determining the moving average of the heater duty cycle over the last ten days.

A rule definition execution module 38 is configured to apply the set of rules from the rule definition module 24 to the set of real-time data measurements stored in the data analysis module 36. As mentioned above, the rules in the rule definition module 24 may be derived based on past trends exhibited by the parameters or based on expert knowledge of the features of the parameters. In a particular implementation, the rules are used to determine a plurality of failure modes for the coldhead component. A coldhead failure may be indicated by the fact that the heater duty cycle parameter shows a negative slope, or zero, or that the vessel pressure shows positive slope, or that the shield temperature is above a threshold value. In addition, the rule definition execution module 38 detects and removes outlier data, non-normal conditions and failure modes that are indicative of failures other than the coldhead component failure.

Then, a prediction model execution module 40 is configured to execute the prediction model 26 (generated by the training subsystem 32) based on the set of real time data measurements. The output of the prediction model execution module 40 is an estimated time-to-failure for the component. The estimated time-to-failure may be further written to an output log file 47. The time-to-failure may then also be communicated to a service engineer to take appropriate actions, such as, for example, changing the coldhead component or re-seating the coldhead component. The set of data measurements may subsequently become a part of the historical database 12 when the actual times of failure for the component become known.

The rule definition execution module 38 is further configured to generate an early alert signal (indicated by the reference numeral 42). The early alert signal 42 is an indication of an impending failure mode related to the component. In particular, the early alert signal 42 is an indication that the parameters lie outside the acceptable rate of change. In a particular embodiment, the alert signal 42 is generated several days prior to the actual date of failure of the component. The rule definition execution module 38 further calculates a confidence level (indicated by the reference numeral 44) for the time to failure estimate generated by the prediction model execution module 40. Further, in accordance with embodiments of the present invention, the confidence level 44 for the predicted time to failure of the component may be derived based on a combination of the plurality of leading parameters, wherein the confidence level may be refined by observing the trends in the data values exhibited by each of the leading parameters.

Based upon the failure prediction made from the plurality of parameters, particularly the leading parameters, a number of other actions may be taken. For example, an automated notification may be generated suggesting or requiring attention, servicing, ordering of parts, replacement of parts, and so forth, particularly of the component predicted to fail. Such actions, or the level of urgency of the action may be based upon the predicted time to failure, the confidence level, and so forth. By way of example, the actions may include automatic generation of messages or other notifications that may be dispatched via email, pager, or telephone. The notifications may be directed to a remote service center, field unit, field service engineer, or any other provider in a position to address the failure.

Exemplary Application of the Failure Prediction Technique

The foregoing failure prediction technique may be applied to a wide range of systems, subsystems and components. In a present embodiment, the technique has been evaluated for predicting failures of components of a superconducting magnet system of an MRI system. It should be noted that many such magnet systems exist and are known in the art. The example and details provided below are intended to explain only one exemplary type of magnet system, and indeed only one type of complex system or component, on which the present failure prediction technique may be applied. It should be understood that the technique is in no way intended to be limited to this or any particular system or implementation.

Figure 2:
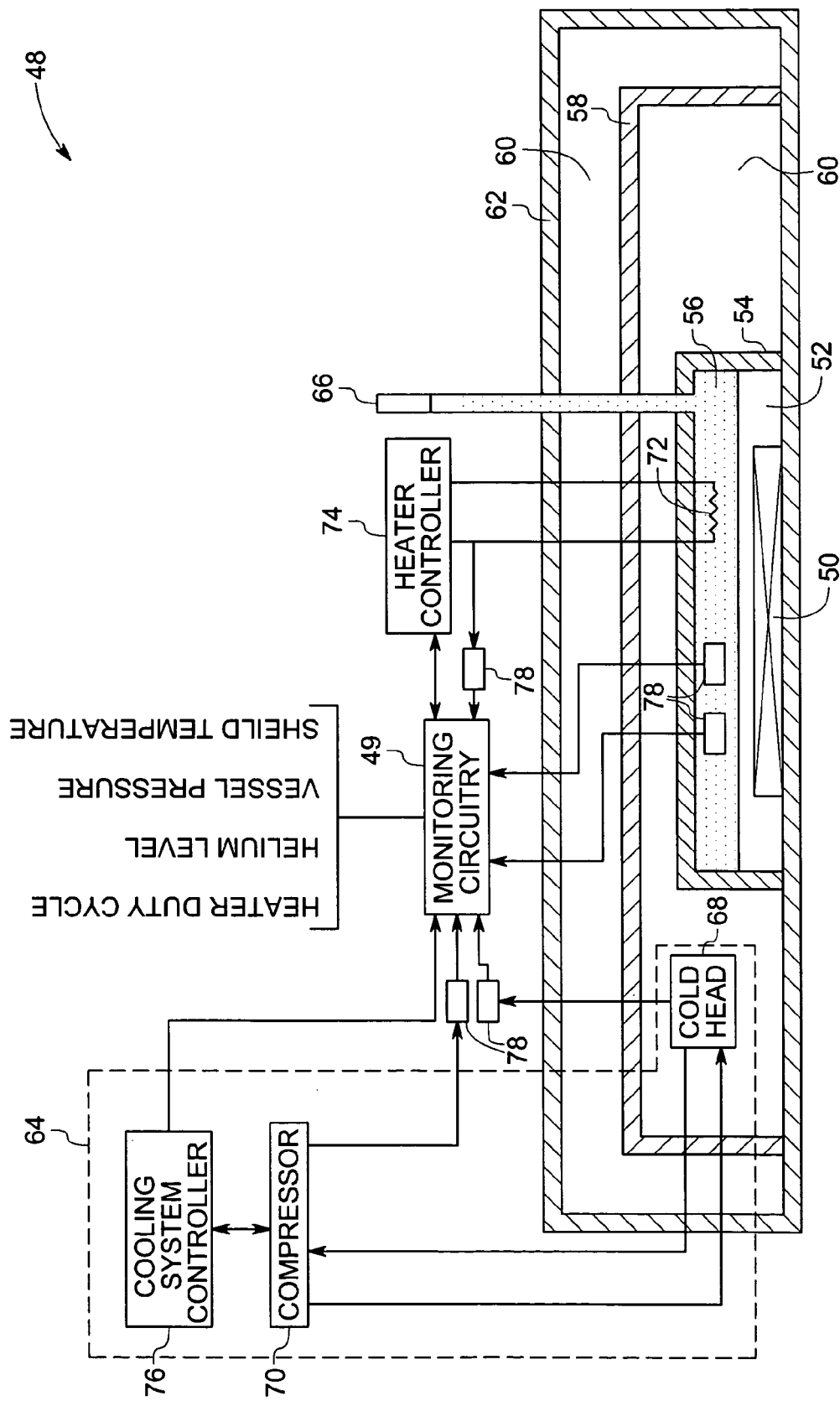
FIG. 2 is an illustration and operation of an exemplary superconducting magnet system.

FIG. 2 is an illustration of a typical operation of an exemplary superconducting magnet system in an MRI scanner. As mentioned above, it should be noted that the MRI scanner is described herein, to depict an exemplary operation of a system that may be benefited by the prediction system 10 of the invention disclosed in FIG. 1, and is not meant to limit the use of the prediction system 10 of the invention to other large systems such as those mentioned above.

Referring to FIG. 2, the MRI scanner 48 generally includes a magnet 50 located toward the center of the MRI scanner 48 wherein the magnet is disposed circumferentially about a patient bore (not shown in figure). The magnet produces the main magnetic field for the MRI scanner. The main magnet is an electromagnet formed of loops of coiled wire. Routing electrical current through the coiled wire produces a magnetic field. To reduce the electrical load necessary to produce the desired main magnetic field, the exemplary electromagnet may be cooled to a superconductive state. It should be noted that only an upper portion (i.e., above the centerline) of the exemplary, tubular MRI scanner 48 is illustrated in FIG. 2. Because of the tubular design, the lower portion is similar to the upper portion, and, as such, the lower portion is not separately discussed.

It should also be noted that, although a tubular scanner structure is described here, other geometries of magnets are known and presently in use, and can benefit from aspects of the present invention. For example, split imaging systems are known, in which an imaging volume is defined between two separated magnet sections. The sections are typically positioned either one above the other, or in a side-by-side arrangement. In either case, however, the superconductive magnet is cooled by a cryogenic system that may be maintained and serviced as described below.

To transition the electromagnet to a superconductive state, the electromagnet 50 may be bathed in a cryogen, such as liquid helium 52, contained in a helium vessel 54, which circumscribes the patient bore and surrounds the electromagnet 50. The liquid helium cools the electromagnet to superconductive temperatures (e.g., −269° C. or 4 K). At superconductive temperatures, the electromagnet 50 (i.e., the loops of coiled wire) conducts electrical current essentially free of electrical resistance. Of course, the particular temperature at which the magnet materials transition to a superconducting state may vary depending upon the material used, and the specific temperature is not a limitation of the present technique. Advantageously, a relatively strong magnetic field (0.5–3.0 Tesla) may be produced at lesser electrical loads in comparison to traditional magnets, thereby reducing the operating costs of producing and maintaining the magnetic field. Other field strengths are, of course, possible, with spectroscopy and other systems obtaining significantly higher flux densities.

Liquid helium 52, similar to other cryogens, vaporizes into a gaseous state, such as gaseous helium or helium vapor 56 at relatively low temperatures (e.g., liquid helium boils at 4.2 K under standard pressure conditions). Accordingly, to insulate the helium 52 and helium vapor 56 from external heat sources, the helium vessel 54 may be surrounded by a radiation heat shield 58. Advantageously, a vacuum region 60 is located between the helium vessel 54 and the heat shield 58, as well as between the heat shield 58 and an outer housing 62 of the MRI scanner 48 to further insulate the helium vessel 54 and magnet 50 from external heat sources.

Furthermore, as also discussed further below, the vaporization of the liquid helium 52 typically increases the pressure in the helium vessel 54. Accordingly, the helium vessel 54 may be coupled to a vent or relief valve 66. In a present embodiment, for example, if pressure in the helium vessel 54 exceeds a desired operating pressure (e.g., 4 psig) and reaches a relieving set point (e.g., 4.5 psig), the vent 66 may release excess helium 56 to relieve the pressure. However, because helium is relatively expensive, the venting of the helium is to be avoided.

To conserve helium, the helium vessel 54 is coupled to a cryogen condensing system 64 (also called cryo-cooler or cryo-condenser), which recondenses gaseous helium 56 back into its liquid phase 52. In the exemplary MRI scanner 48, the cryogen condensing system 64 includes a coldhead 68 coupled to a compressor 70. In one embodiment, the compressor 70 is a two-stage coldhead machine with the second (colder) stage cooling the recondensor (coldhead 68) while the first stage cools the heat shield 58. As appreciated by those skilled in the art, the compressor 70 pressurizes a refrigerant, such as helium gas (in a circuit separate from the liquid bath), and circulates the refrigerant to the coldhead 68. By allowing the refrigerant to decrease in pressure in the coldhead 68, the fins (not shown) of the coldhead 68 (recondensor) may be conduction cooled to the condensation point of the cryogen, that is, low enough to cause the helium vapor 56, for example, to return to its liquid phase. In a cyclical manner, the helium vapor 56 (gaseous helium) is routed from the vessel (i.e., rises from the vessel) to the recondensor (coldhead 68) and across the fins. The fins, which are cooled to approximately 2–4 K, provide heat transfer surface area and condense the helium vapor back into its liquid phase. The recondensed liquid helium 52 is routed (i.e., by gravity) back into the helium vessel 54, thereby conserving the helium in the vessel 54 and producing an equilibrium between the liquid and gaseous phases of the helium. It should be noted, as an alternative configuration to that illustrated, the coldhead 68, may be disposed, for example, inside helium vessel 54 (i.e. in the vapor space of the vessel), as opposed to the illustrated configuration of placement of the coldhead 68 outside the helium vessel 54.

During operation of the MRI scanner 48, it may be advantageous to maintain the pressure within the helium vessel 54 within predetermined parameters. However, if, for example, the equilibrium in the helium vessel 54 is biased towards the liquid phase of the helium by the coldhead 68, the helium vessel 54 may reach a negative pressure condition allowing atmospheric gases to be drawn into the vessel 54. If atmospheric gases enter the helium vessel 54, water vapor and other elements in the atmosphere may freeze, causing clogs in the cooling system that degrade the performance and, in certain instances, leading to failure of the cooling system 64 and/or the MRI scanner 48. Thus, to increase the pressure and prevent a vacuum, a heating element 72, such as a resistive heating element, is located in the helium vessel 54. The heater typically maintains a positive pressure condition, such as a pressure greater than that of the environment (i.e., greater than approximately 0 psig or 14.7 psia). As discussed further below, while the coldhead, in general, operates continuously, power to the heating element 72 cycles to maintain equilibrium within the vessel. In a present embodiment, power to the heating element is controlled in a closed-loop manner based upon pressure detected within the vessel, to maintain the pressure between desired minimum and maximum levels, and thus to maintain the desired temperature.

Alternatively, if, for example, the equilibrium is biased towards the gaseous phase by the coldhead operating inefficiently or external heat sources, the pressure in the vessel 54 may increase, along with a potential increase in the temperature of the helium, leading to an undesired venting of helium and/or degradation in image quality. As discussed further below, if a high-pressure condition is detected, a cooling system controller 76 may optimize and adjust operations of the condensing system 64 to bias the equilibrium of the helium towards the liquid phase, thereby reducing the pressure in the vessel 54.

To monitor the operation of the MRI scanner 48, a plurality of sensors 78 may be located throughout the MRI scanner 48, and particularly on or in the main magnet structures and support systems. For example, temperature and pressure sensors, collectively indicated generally by reference numeral 78, located in the helium vessel 54 may monitor conditions in the helium vessel 54. Additionally, other sensors 78 may monitor the cooling system 64 (e.g., operation of the coldhead 68 and the compressor 70). Similarly, yet other sensors 78 may monitor the pressure control circuit and heating system (e.g., operation of the heater controller 74 and heating element 72). Of course, there may be any number of sensors 78 located throughout the MRI scanner 48 for monitoring any number of conditions.

The various sensors 78 throughout the system may provide operational data regarding the MRI scanner 48 to monitoring circuitry 49. Moreover, the heater controller 74 and the cooling system controller, and in general, components of a pressure control circuit, may also provide data to the monitoring circuitry 49. By way of example, the monitoring circuitry 49 may receive and process data regarding the temperature within the vessel, the pressure within the vessel, the heater duty cycle, coolant (refrigerant) pressure within the condensing/compressor system, or a host of any other operating conditions regarding the MRI scanner. In general, operating conditions may be examined to control and maintain magnet temperatures and superconductivity, to evaluate magnet performance and MRI system performance, to decide service intervals, and so forth.

As previously discussed, an approach for maintaining the low magnet temperatures and thus superconductivity and MRI image quality, is to surround the magnet with a boiling liquid pool of a coolant or refrigerant, such as a cryogen. Boiling liquid pools, because of their use of heat of vaporization to consume heat, promote a constant magnet temperature. In other words, because a liquid boils at constant temperature (at fixed pressure), a boiling coolant may better maintain constant the desired magnet temperature. In contrast, the temperature of a coolant operating below its boiling point may vary with changes in sensible heat. Additionally, the boiling liquid pool is generally suited for isolated stand-alone systems, such as the typical cryogenic cooling application in an MRI system. For example, the condensing (coldhead) and vaporizing (heater) actions on the cryogen may be implemented within the cryogenic cooling system. In contrast, coolant systems that primarily absorb sensible heat below the coolant's boiling point generally require processing of the coolant to remove the absorbed sensible heat, and thus, may require a relatively sophisticated integration, for example, with a coolant utility system. What is more, with a vaporizing liquid, the heat of vaporization is typically a larger consumer of heat per pound of refrigerant than a non-vaporizing liquid (sensible heat). Thus, for coolant systems relying on sensible heat, more coolant inventory is generally required in the cooling system. And finally, boiling cryogens may be attractive, for example, because of their low boiling points, which permit avoidance of vacuum operating conditions in achieving the desired low temperatures.

In the example of a desired magnet temperature of 4 K, liquid helium may be especially suited for the cryogen application because the atmospheric boiling point of helium is about 4 K. In other words, the helium boils at 4 K, the desired magnet temperature, at relatively low, positive, operating pressures (i.e., near atmospheric), generally permitting simpler and more economical system designs than, for example, vacuum conditions for coolants with higher boiling points, or with higher operating pressures for compressed refrigerant systems. Other cryogens, such as nitrogen, may vaporize at the desired 4 K but under vastly different operating pressures. At typical operating pressure of 4 psig and temperature of 4 K, nitrogen is a solid. As will be appreciated by those skilled in the art, both vacuum conditions and high operating pressures for the cryogen that surrounds the magnet are generally to be avoided. A cryogen operating at a pressure less than that of the environment may drive air from the environment into the cryogen and thus contaminate the cryogen system. For the opposite end, at high operating pressures, cryogen leaks to the environment, for example, through fittings, gaskets, and the like, may increase with increasing pressure. Vacuum conditions or high operating pressures generally require equipment rated for those conditions and may complicate operation and maintenance of the equipment.

A useful aspect of the cryogen pool is that control of cryogen pressure may be used to maintain a vaporizing cryogen, such as helium, at a pressure advantageous to system design issues discussed above, as well as, to give a desired boiling point temperature that corresponds to the desired magnet temperature. As previously discussed, the cryogen pressure may be controlled, for example, by removing heat and condensing helium vapor (i.e., via a coldhead) or by adding heat and vaporizing helium liquid (i.e., via a heater). Additionally, cryogen pressure elevated above a predetermined pressure setting may be dissipated by relieving cryogen (primarily vapor), for example, through a relief device. For predictive maintenance and other reasons, the cryogen pressure and related heater duty cycle may be indicative of performance of the superconducting magnet system.

In accordance with a particular embodiment of the present invention, (and as discussed in FIG. 1), a plurality of parameters related to the operation of the coldhead 68, such as for example, the heater duty cycle parameter, the vessel pressure parameter and the shield temperature parameter are monitored to accommodate advanced notification of cryogen system behavior, such as changes in the pressure-temperature equilibrium, as well as, changes in performance of system components (e.g., coldhead, heater, thermal insulation, and so forth) to ultimately predict the time to failure of the coldhead component of the system.

Application of the Failure Prediction Technique to the Exemplary System

Figure 3:
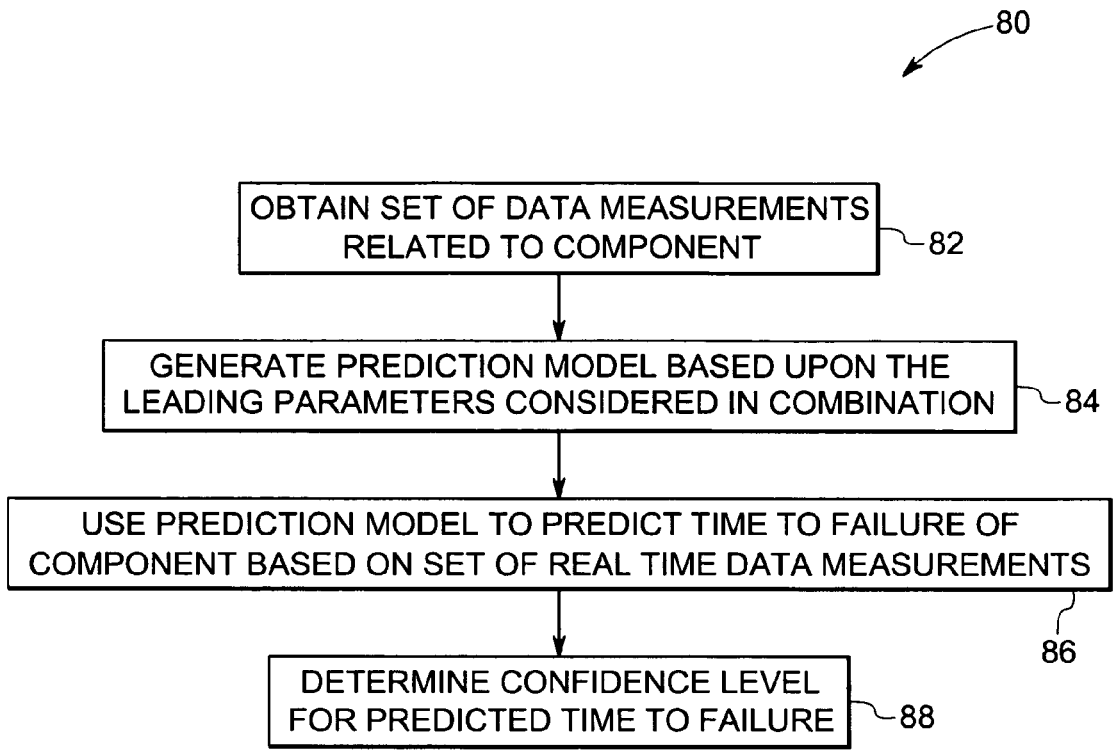
FIG. 3 is a high level flowchart describing exemplary steps for predicting a time to failure for a component.

FIG. 3 is a high level flowchart describing exemplary steps for predicting a time to failure for a component. In step 82, a set of data measurements related to the component is obtained. The data measurements are representative of a plurality of parameters including a plurality of leading parameters. In a particular embodiment, and as discussed above, the component is a coldhead component of a superconducting magnet system in an MRI system, and the leading parameters represent a heater duty cycle parameter, a vessel pressure parameter and a shield temperature associated with the coldhead component. In step 84, a prediction model is generated based upon the leading parameters considered in combination as described in FIG. 1. In step 86, the prediction model generated in step 84, is used to predict the time to failure of the component based on a set of real-time data measurements. In particular, and as described with respect to FIG. 1, the plurality of parameters are processed to predict the time to failure of the component. In step 88, a confidence level for the predicted time to failure is determined based upon the plurality of parameters, in a manner as described in FIG. 1.

Figure 4:
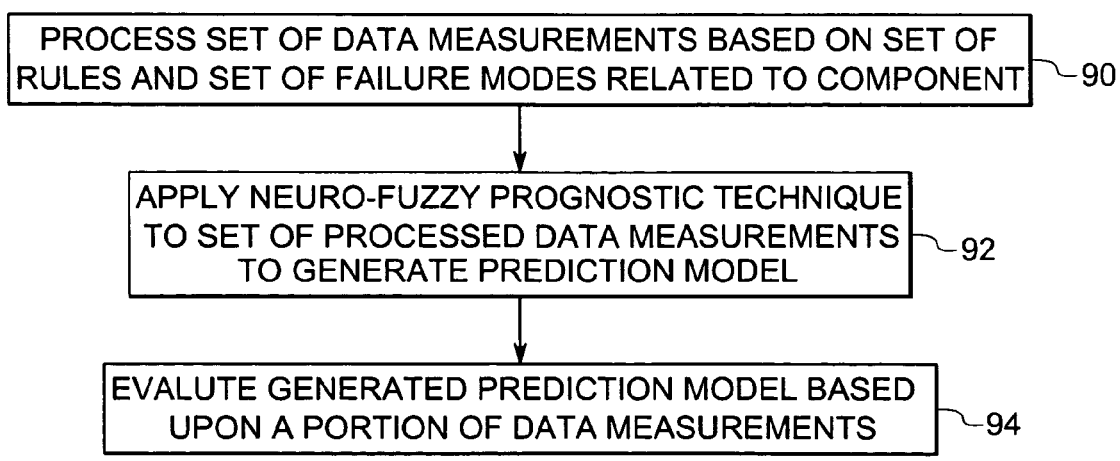
FIG. 4 is a flowchart illustrating, in greater detail, certain of the exemplary steps depicted in FIG. 3.

FIG. 4 is a flowchart illustrating, in greater detail, the step 84 described in FIG. 3. In step 90, the set of data measurements are processed based on a set of rules related to plurality of parameters and one or more failure modes related to the component, as discussed with respect to FIG. 1. In step 92, a neuro-fuzzy prognostic technique is applied to the set of processed data measurements to generate a prediction model. In a particular embodiment, and as discussed with respect to FIG. 1, the neuro-fuzzy prognostic technique is the adaptive neuro fuzzy inference system (ANFIS). In step 94, the generated prediction model is evaluated based upon a portion of data measurements that are a part of the validation dataset as discussed with respect to FIG. 1.

The embodiments illustrated and described above disclose a system and method for predicting component failures in large systems that may have non-uniform component degradation rates. The rule definition module disclosed above, generates an "early alert" signal for an impending failure mode and further calculates a confidence level in the existence of the specific failure mode based on a time to failure estimate for the component generated by the prediction model. The alert signal, along with the time to failure estimate and the confidence level may be used to generate a series of alerts and warnings until a service action is taken to resolve the failure.

With respect to the coldhead component in an MRI system as described above, the generation of the alert signal, along with the time to failure estimate and the confidence level will help avoid emergency shutdowns and allow enough time to repair system faults on a scheduled basis. As a result, patient scheduling and ordering of emergency part orders may also be improved. Also, as will be appreciated by those skilled in the art, the coldhead component in the MR imaging system described above, typically has a life expectancy of approximately two years and failure of this component may cause significant expenses, since cryogen may be lost through a vent to the atmosphere when the cooling capacity of the system is reduced by coldhead failure and a subsequent increase in vessel pressure occurs. The time to failure estimate generated by embodiments of the present invention provides specific knowledge of impending failure, leading to the prevention or minimization of these losses.

As will be appreciated by those skilled in the art, the embodiments and modules illustrated and described above will typically include or may be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions.

In the context of the present technique, the computer-readable medium is any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for predicting a time to failure of a component in a system, the method comprising:
   obtaining a set of data measurements related to the component, wherein the set of data measurements are representative of a plurality of parameters, including a plurality of leading parameters;
   generating a prediction model based upon the leading parameters considered in combination, wherein generating the prediction model comprises processing the set of data measurements based on a set of rules related to the plurality of parameters and one or more failure modes related to the component;
   using the prediction model to predict the time to failure of the component based on a set of real-time data measurements, wherein the plurality of parameters are processed to predict the time to failure for the component; and
   determining a confidence level for the predicted time to failure based upon the plurality of parameters.

2. The method of claim 1, wherein the system is a superconducting magnet system.

3. The method of claim 2, wherein the leading parameters represent at least one of a heater duty cycle, a vessel pressure and a shield temperature associated with the superconducting magnet system.

4. The method of claim 3, further comprising one or more additional parameters, wherein the additional parameters represent at least one of a water flow parameter and a water temperature parameter associated with the superconducting magnet system.

5. The method of claim 1, wherein generating a prediction model comprises:
   applying a neuro-fuzzy prognostic technique to the set of processed data measurements to generate the prediction model; and
   evaluating the generated prediction model based upon a portion of data measurements.

6. The method of claim 1, wherein the set of rules specify an acceptable rate of change for the plurality of parameters.

7. The method of claim 1, wherein the failure mode is an indication of impending failure related to the component.

8. The method of claim 1, further comprising accessing and processing the set of real-time data measurements.

9. The method of claim 8, comprising applying the set of rules to the set of real-time data measurements to generate an early alert signal for an impending failure mode related to the component.

10. The method of claim 1, further comprising automatically generating a service notification for service of the component based upon the failure prediction.

11. A system for predicting a time to failure for a component, the system comprising:
   a data acquisition system, configured to obtain a set of data measurements related to the component, wherein the set of data measurements are representative of a plurality of parameters, including a plurality of leading parameters;
   a training subsystem, configured to generate a prediction model based upon the leading parameters considered in combination, wherein the training subsystem comprises a rule definition module configured to process the set of data measurements from the data acquisition system, based on a set of rules for the plurality of parameters, wherein the set of rules specify an acceptable rate of change for the plurality of parameters; and
   a runtime system configured to use the prediction model generated by the training system to predict the time to failure of the component based on a set of real-time measurements, wherein the plurality of parameters are processed to predict the time to failure for the component and a confidence level for the predicted time to failure.

12. The system of claim 11, wherein the training subsystem further comprises:
   a failure identification module configured to process the set of data measurements from the data acquisition system, based on a set of failure modes related to the component;
   a prediction model configured to receive the set of processed data measurements from the failure identification module and the rule definition module and apply a neuro-fuzzy prognostic technique to the set of data measurements to predict a time to failure for the component; and
   a validation engine configured to evaluate the generated prediction model based upon a portion of data measurements.

13. The system of claim 11, wherein the runtime subsystem further comprises a data analysis module, a rule definition execution module and a prediction model execution module.

14. The system of claim 13, wherein the data analysis module is configured to acquire and process the set of real-time data measurements.

15. The system of claim 13, wherein the rule definition execution module is configured to apply the set of rules from the rule definition module to the set of real-time data measurements to generate an early alert signal for an impending failure mode related to the component.

16. The system of claim 11, further comprising automatically generating a service notification for service of the component based upon the failure prediction.

17. The system of claim 13, wherein the prediction model execution module is configured to execute the generated prediction model to predict the time to failure of the component based on the set of real-time data measurements.

18. The system of claim 17, wherein the rule definition execution module is further configured to generate the confidence level for the predicted time to failure.

19. The system of claim 11, wherein the component is part of a superconducting magnet system.

20. The system of claim 19, wherein the leading parameters represent at least one of a heater duty cycle, a vessel pressure and a shield temperature associated with the superconducting magnet system.

21. The system of claim 19, further comprising one or more additional parameters, wherein the additonal parameters represent at least one of a water flow parameter and a water temperature parameter associated with the superconducting magnet system.

22. A method for predicting a time to failure of a coldhead component in a superconducting magnet system, the method comprising:
   obtaining a set of data measurements related to the coldhead component, wherein the set of data measurements are representative of a plurality of parameters, and wherein the plurality of parameters include at least one of a heater duty cycle, a vessel pressure and a shield temperature associated with the coldhead component;

generating a prediction model based upon the leading parameters considered in combination, wherein generating a prediction model comprises processing the set of data measurements based on a set of rules related to the plurality of parameters;

using the prediction model to predict the time to failure of the coldhead component based on a set of real-time data measurements, wherein the plurality of parameters are processed to predict the time to failure for the component; and determining a confidence level for the predicted time to failure based upon the plurality of parameters.

23. At least one computer-readable medium storing computer instructions for instructing a computer system for predicting a time to failure of a component in a system, the computer instructions comprising:

obtaining a set of data measurements related to the component, wherein the set of data measurements are representative of a plurality of parameters, including a plurality of leading parameters;

generating a prediction model based upon the leading parameters considered in combination, wherein generating a prediction model comprises processing the set of data measurements based on a set of rules related to the plurality of parameters;

using the prediction model to predict the time to failure of the component based on a set of real-time data measurements, wherein the plurality of parameters are processed to predict the time to failure for the component; and determining a confidence level for the predicted time to failure based upon the plurality of parameters.

24. At least one computer-readable medium storing computer instructions for instructing a computer system for predicting a time to failure of a coldhead component in a superconducting magnet system, the computer instructions comprising:

obtaining a set of data measurements related to the coldhead component, wherein the set of data measurements are representative of a plurality of parameters, and wherein the plurality of parameters include at least one of a heater duty cycle, a vessel pressure and a shield temperature associated with the coldhead component;

generating a prediction model based upon the plurality of parameters considered in combination, wherein generating a prediction model comprises processing the set of data measurements based on a set of rules related to the plurality of parameters and one or more failure modes related to the component;

using the prediction model to predict the time to failure of the coldhead component based on a set of real-time data measurements, wherein the plurality of parameters are processed to predict the time to failure for the component; and determining a confidence level for the predicted time to failure based upon the plurality of parameters.

25. The computer-readable medium of claim 23, wherein generating a prediction model further comprises processing the set of data measurements based on one or more failure modes related to the component.

26. The computer-readable medium of claim 23, wherein generating a prediction model further comprises applying a neuro-fuzzy prognostic technique to the set of processed data measurements to generate the prediction model and evaluating the generated prediction model based upon a portion of data measurements.

27. The computer-readable medium of claim 24, wherein generating a prediction model further comprises applying a neuro-fuzzy prognostic technique to the set of processed data measurements to generate the prediction model and evaluating the generated prediction model based upon a portion of data measurements.

* * * * *